F. K. LAWRENCE.
TIRE RACK.
APPLICATION FILED JUNE 3, 1920.
1,405,378.
Patented Jan. 31, 1922
2 SHEETS—SHEET 1.
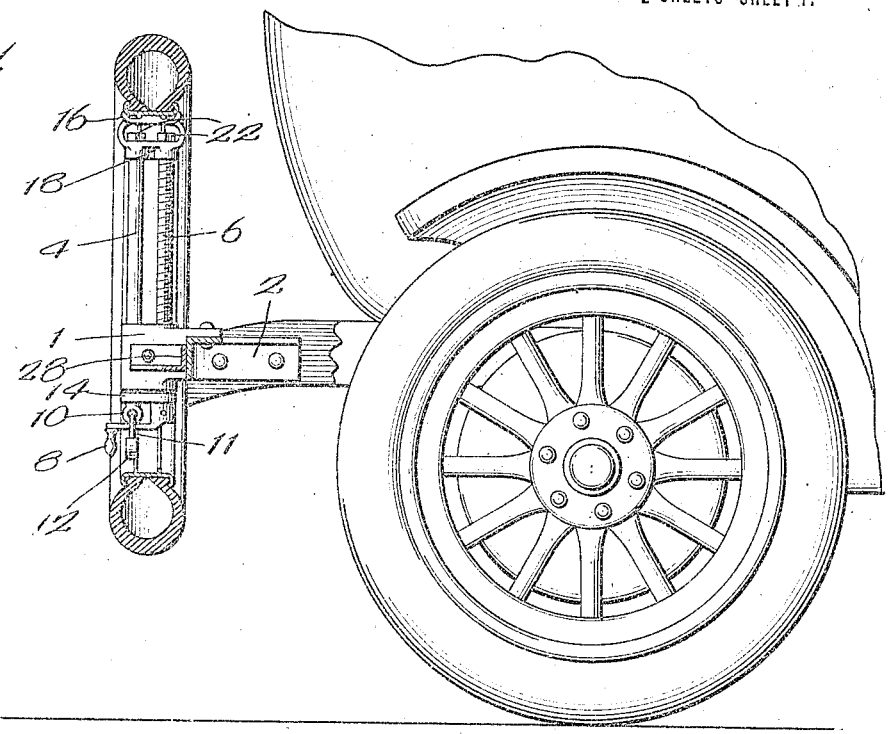
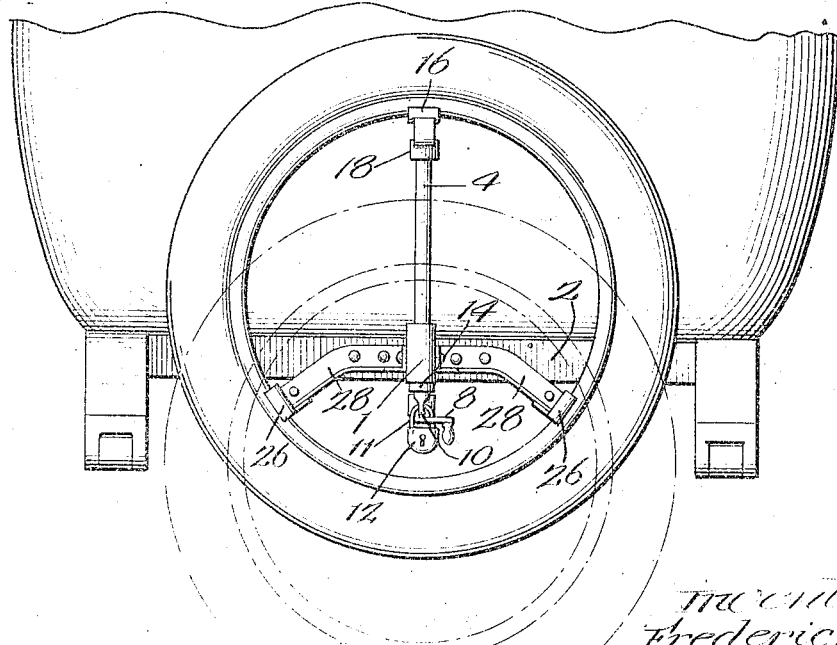
Inventor:
Frederick K. Lawrence
By Cheever & Cox
Attys

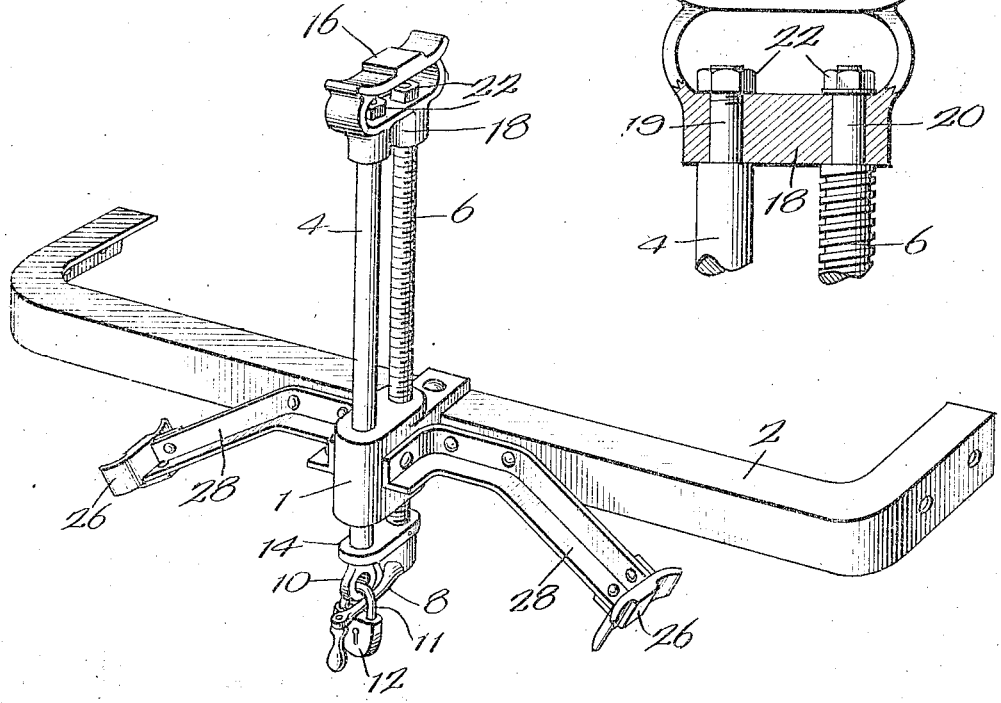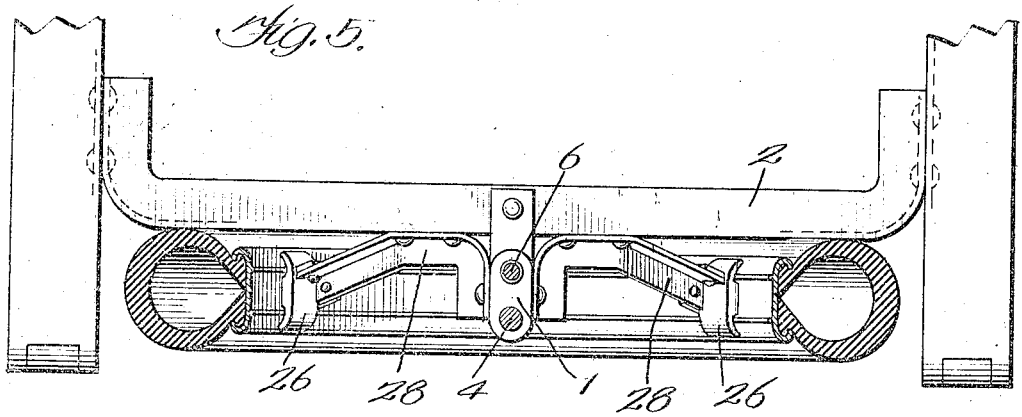

UNITED STATES PATENT OFFICE.

FREDERICK K. LAWRENCE, OF CHICAGO, ILLINOIS.

TIRE RACK.

1,405,378. Specification of Letters Patent. Patented Jan. 31, 1922.

Application filed June 3, 1920. Serial No. 386,164.

*To all whom it may concern:*

Be it known that I, FREDERICK K. LAWRENCE, a citizen of the United States, residing at Chicago, in the county of Cook and State of Illinois, have invented a certain new and useful Improvement in Tire Racks, of which the following is a specification.

My invention relates to tire racks, especially for the spare rims and tires of motor vehicles, and in certain respects is analogous to the type of rack shown in my copending application filed on the 26th day of May, 1920, Serial No. 384,459 (Case 9). The general purpose of the device is to provide means by which a spare rim and tire may be raised from the ground up into traveling position on the rack or vice versa with the expenditure of but slight effort by the operator. Another object is to provide means whereby the tire may be let down entirely onto the ground and be thereafter completely disengaged, thus avoiding the need of lifting the tire or otherwise manipulating it to free it from the rack. Another object is to provide means whereby the tire may be securely locked in place when in traveling position.

I accomplish my objects by the mechanism illustrated in the accompanying drawings in which—

Figure 1 is an assembly view from the side of the vehicle showing the rack and tire in traveling position. The tire and rim are shown in vertical axial section.

Figure 2 is similar to Figure 1 except that the parts are viewed in rear elevation.

Figure 3 is a perspective view of the rack showing it mounted upon one of the stationary frame members of the vehicle.

Figure 4 is a fragmentary sectional view showing the manner of mounting the upper rim seat.

Figure 5 is a plan view of the parts shown in Figure 3 with the addition of a rim and tire in place, the latter being shown in horizontal axial section.

Like numerals denote like parts throughout the several views.

In the form selected to illustrate the invention, the device has a main bracket 1 adapted to be riveted or otherwise secured to a cross member 2 attached to the chassis of the vehicle. This bracket is vertically apertured to accommodate two upright movable members, one of which constitutes a guide rod 4 and the other a screw 6. The guide rod is slidable in the bracket while the screw works in a thread within the bracket. At its lower end, beneath the bracket, the screw has a crank handle 8 approximately on the level with it but slightly below an eye 10 formed at the lower end of the guide rod 4. The eye is for locking purposes, being adapted to receive the bow 11 of a padlock 12 which may also pass around the crank handle to prevent rotation of the screw 6, as best shown in Figure 3. For the sake of strength and security it is desirable that the lower end of the rod and screw be linked together by a link 14 which somewhat loosely encircles them both. At the upper end of the rod and screw is a rim seat 16 adapted to engage the tire rim. This is carried by a block 18 which is vertically apertured at two points to receive the reduced upper ends 19, 20 of the rod 4 and screw 6 respectively, as best shown in Figure 4. The result of this construction is that the screw may rotate without rotating the block, but its rotation will raise and lower the block and this in turn will cause the guide rod to slide within the bracket 1 and prevent the block from rotating about the screw as an axis. The block is held seated upon the parts 4 and 6 by nuts 22 screwing onto the upper ends thereof.

The rack also has two stationary rim seats 26 which, according to this design, are located symmetrically on opposite sides of the center of the device and near the bottom thereof. They face downward and outward and are adapted to overlie and engage the lower portion of the wheel rim. The stationary rim seats are supported in any suitable manner, in the present case being carried by a bowed angle iron 28 fastened to the back of the member 2 and at their inner ends engaging and being fastened to the sides of the bracket 10 for bracing the latter.

In practice, when the operator is ready to raise a rim and tire to traveling position he rolls them along the ground to the position indicated by dotted lines, Figure 2. He also backs off the screw 6 until the rim seat 16 is so low that it may freely pass under the rim. He then swings the upper side of the tire to a point above seat 16 and then rotates the crank handle 8 in either direction to raise the seat 16 with the suspended rim and tire upon it. This action is continued until the movable seat 16 draws the rim into firm and close engagement with the stationary seats 26. He then brings the crank handle 8 angularly to a position adjacent to the eye 10 in the guide rod after which he applies the padlock and the parts become securely locked in place.

On account of the screw motion, very little physical exertion is required of the operator in raising the tire and still less in lowering it. Furthermore, by making the screw and guide rod long enough the device may be made to accommodate a rim of widely different diameters. In other words, without changing the size or design of the rack it becomes applicable to different sizes of rims. It will be seen that in lowering the tire the latter immediately disengages the stationary seats 26. It is thereafter supported upon the movable seat alone. This latter may then be lowered, first, until the tire is supported entirely on the ground, and then still further until the movable seat entirely disengages and clears the tire and rim, thus permitting the operator to simply roll the tire away without having to lift or drag it in any way to free it from the rack. This is of great advantage for tires and rims are usually heavy and frequently muddy or dusty, thus making it both inconvenient and unpleasant to handle them.

It will be noted that I have positioned the guide rod 4 farthest to the rear. It thus acts as a guard for the threaded screw 6, protecting the latter from collision with objects approaching from the rear of the vehicle.

Having thus described my invention, what I claim as new and desire to secure by Letters Patent is:

1. A tire rack for motor vehicles having a stationary seat adapted to engage the tire, a movable seat adapted to support the tire and to bring it into engagement with the stationary seat to hold the tire in place, said movable seat being also adapted to lower the tire to the ground, and a screw carried by the vehicle and adapted to operate the movable seat.

2. A tire rack having a stationary seat for the tire, a movable seat for moving the tire into and out of engagement with the stationary seat, a screw for actuating the movable seat, and a stationary threaded member in which the screw works, the screw being adapted to lower the movable seat out of engagement with the tire when the latter rests upon the ground.

3. A tire rack and carrier adapted to be attached to a motor vehicle and to carry the tire in a substantially vertical plane, the device having a stationary seat adapted to engage the tire, and a vertically movable seat adapted to support the tire and adapted to move the tire vertically in its own plane into and out of engagement with the stationary seat.

4. A tire rack having a stationary seat for the tire, a movable seat for moving the tire into and out of engagement with the stationary seat, a screw for actuating the movable seat, a stationary threaded member in which the screw works, a crank handle on the screw for rotating it, and means for locking the crank handle against angular movement, the screw being adapted to descend to a point at which the tire will rest upon the ground.

5. A tire rack having a pair of stationary tire seats facing downward and outward, a stationary bracket, an upright screw working in said bracket, a movable seat swiveled to the upper end of the screw for locking the tire in engagement with the stationary seats, and means for rotating the screw, the screw being adapted to descend sufficiently to let the tire down onto the ground and thereafter descend still further and lower the movable seat out of engagement with the tire.

6. A tire rack for motor vehicles, having a stationary seat for the tire, a movable seat for moving the tire into and out of engagement with the stationary seat, and a screw adapted to lower the movable seat sufficiently to bring the tire into contact with the ground.

7. A tire rack and carrier for motor vehicles having a movable seat for suspending the tire, a stationary seat adapted to cooperate with the movable seat to hold the tire in place, and a screw carried by the vehicle and adapted to raise and lower the movable seat vertically, whereby the tire will always move in its own plane, said screw being adapted to lower the movable seat to a point where the tire will rest directly upon the ground.

8. A tire rack and carrier adapted to be attached to a motor vehicle and having a stationary seat for engaging the tire, a stationary bracket, a screw working in said bracket, a movable seat swiveled upon the screw and adapted to support the tire, a guide rod connected to the movable seat for preventing rotation thereof about the screw as an axis, and means for guiding said rod.

9. A tire rack for motor vehicles having a stationary seat for the tire, a movable seat for moving the tire into and out of engagement with the stationary seat, a screw and a stationary member secured to the vehicle in which the screw works, the screw being adapted to descend sufficiently to bring the tire into contact with the ground and to thereafter descend sufficiently to entirely disengage the tire.

10. In combination with a motor vehicle, a tire supporting means carried thereby, said tire supporting means including stationary seats adapted to engage the interior of the rim and a vertically movable seat adapted to engage the interior of the rim at the upper portion thereof for supporting it, said movable seat being adapted to be raised sufficiently to bring the rim into engagement with the stationary seats and being adapted to descend to an elevation less than the elevation of the interior of the rim at the upper portion when the tire is resting upon the ground.

11. A tire rack and carrier adapted to be fastened to a motor vehicle, the device having a stationary lower tire seat, a stationary bracket, an upright screw working in said bracket, a movable seat swiveled to the upper end of the screw, a guide rod parallel and adjacent to the screw and fastened at its upper end to the movable seat, and means for guiding said guide rod, the guide rod being located to the rear of the screw for protecting the latter against collision from the rear of the vehicle.

12. A tire rack and carrier adapted to be fastened to a motor vehicle and having a vertically movable seat adapted to engage and interlock with the inside of the rim of the tire, a stationary lower seat adapted to make interlocking engagement with the rim of the tire when the two are in cooperative engagement, and means for raising and lowering the movable seat in a vertical plane to lift the tire from the ground and to bring the rim thereof into interlocked engagement with the stationary seat.

In witness whereof, I have hereunto subscribed my name.

FREDERICK K. LAWRENCE.